US012676150B2

(12) United States Patent
Shoop et al.

(10) Patent No.: US 12,676,150 B2
(45) Date of Patent: Jul. 7, 2026

(54) INAUDIBLE FREQUENCY ENVIRONMENTAL CONTROL

(71) Applicant: Adeia Guides Inc., San Jose, CA (US)

(72) Inventors: David D. Shoop, San Jose, CA (US); Dylan M. Wondra, Mountain View, CA (US)

(73) Assignee: Adeia Guides Inc., San Jose, CA (US)

( * ) Notice: Subject to any disclaimer, the term of this patent is extended or adjusted under 35 U.S.C. 154(b) by 117 days.

(21) Appl. No.: 18/544,918

(22) Filed: Dec. 19, 2023

(65) Prior Publication Data

US 2024/0395248 A1    Nov. 28, 2024

Related U.S. Application Data

(63) Continuation of application No. 17/234,916, filed on Apr. 20, 2021, now Pat. No. 11,978,446, which is a
(Continued)

(51) Int. Cl.
*G10L 15/22*        (2006.01)
*G10L 25/51*        (2013.01)
(Continued)

(52) U.S. Cl.
CPC .............. *G10L 15/22* (2013.01); *G10L 25/51* (2013.01); *G10L 25/84* (2013.01); *H04B 11/00* (2013.01);
(Continued)

(58) Field of Classification Search
CPC .......... G10L 15/22; G10L 25/51; G10L 25/84
See application file for complete search history.

(56) References Cited

U.S. PATENT DOCUMENTS 6,421,453 B1    7/2002  Kanevsky et al.
9,318,912 B2    4/2016  Baarman et al.
(Continued)

FOREIGN PATENT DOCUMENTS

CA        3138709 A1    11/2020
WO    2020077006 A1     4/2020
(Continued)

OTHER PUBLICATIONS

U.S. Appl. No. 18/771,899, filed Jul. 12, 2024, David D. Shoop.
(Continued)

*Primary Examiner* — Shaun Roberts
(74) *Attorney, Agent, or Firm* — HG LAW LLP

(57)        ABSTRACT

Systems and methods may be used to detect an inaudible signal associated with a first audible signal of an audio input. The inaudible signal may include a frequency signature. The frequency signature may be associated with an electronic device type. The systems and methods may activate a response monitor. The response monitor may be activated for a predetermined time. The response monitor may be activated responsive to the frequency signature. The systems and methods may determine a content characteristic of the first audible signal based on the inaudible signal. The systems and methods may include generating a message. The message may be based on the content characteristic. The systems and methods may include transmitting the message. The message may be transmitted on a condition that a second audible signal corresponds to the message and is received within the predetermined time.

20 Claims, 8 Drawing Sheets

Related U.S. Application Data continuation of application No. 16/296,928, filed on Mar. 8, 2019, now Pat. No. 11,011,169.

(51) Int. Cl.

| | |
|---|---|
| *G10L 25/84* | (2013.01) |
| *H04B 11/00* | (2006.01) |
| *H04N 21/436* | (2011.01) |
| *H05B 47/155* | (2020.01) |

(52) U.S. Cl.
CPC ..... *H04N 21/43615* (2013.01); *H05B 47/155* (2020.01); *G10L 2015/228* (2013.01)

(56) References Cited

U.S. PATENT DOCUMENTS

| | | | |
|---|---|---|---|
| 9,472,196 | B1 | 10/2016 | Wang et al. |
| 10,339,936 | B2 | 7/2019 | Storti |
| 10,932,344 | B2 | 2/2021 | Shoop et al. |
| 10,956,123 | B2 | 3/2021 | Shoop et al. |
| 11,011,169 | B2 | 5/2021 | Shoop et al. |
| 11,074,914 | B2 | 7/2021 | Shoop et al. |
| 11,522,619 | B2 | 12/2022 | Shoop et al. |
| 11,677,479 | B2 | 6/2023 | Shoop et al. |
| 11,711,879 | B2 | 7/2023 | Shoop |
| 11,960,789 | B2 | 4/2024 | Shoop et al. |
| 11,978,446 | B2 | 5/2024 | Shoop et al. |
| 12,033,626 | B2 | 7/2024 | Shoop et al. |
| 12,063,076 | B2 | 8/2024 | Shoop et al. |
| 12,334,987 | B2 | 6/2025 | Shoop et al. |
| 12,430,098 | B2 | 9/2025 | Shoop et al. |
| 2005/0024488 | A1 | 2/2005 | Borg |
| 2008/0002606 | A1 | 1/2008 | Cheung et al. |
| 2008/0086742 | A1 | 4/2008 | Aldrey et al. |
| 2008/0155633 | A1 | 6/2008 | Watson |
| 2011/0002471 | A1 | 1/2011 | Wihardja et al. |
| 2011/0165912 | A1 | 7/2011 | Wang et al. |
| 2011/0214143 | A1 | 9/2011 | Rits et al. |
| 2011/0251954 | A1 | 10/2011 | Chin |
| 2012/0075083 | A1 | 3/2012 | Isaacs |
| 2012/0127072 | A1 | 5/2012 | Kim |
| 2012/0295560 | A1 | 11/2012 | Mufti |
| 2013/0080092 | A1 | 3/2013 | Yogeeswaran et al. |
| 2013/0198786 | A1 | 8/2013 | Cook et al. |
| 2014/0029768 | A1 | 1/2014 | Hong et al. |
| 2015/0113094 | A1 | 4/2015 | Williams et al. |
| 2015/0162006 | A1 | 6/2015 | Kummer |
| 2015/0169066 | A1 | 6/2015 | Plagemann et al. |
| 2015/0188643 | A1 | 7/2015 | Ansell |
| 2015/0382047 | A1 | 12/2015 | Van Os et al. |
| 2016/0019901 | A1 | 1/2016 | Topchy et al. |
| 2016/0165333 | A1 | 6/2016 | Gokingco et al. |
| 2017/0118697 | A1 | 4/2017 | Soldati et al. |
| 2018/0322881 | A1 | 11/2018 | Min et al. |
| 2018/0343481 | A1 | 11/2018 | Loheide et al. |
| 2018/0350356 | A1 | 12/2018 | Garcia |
| 2019/0043471 | A1 | 2/2019 | Maziewski et al. |
| 2019/0043503 | A1 | 2/2019 | Bauer et al. |
| 2019/0122691 | A1 | 4/2019 | Roy et al. |
| 2020/0068245 | A1 | 2/2020 | Sinnott et al. |
| 2020/0082816 | A1 | 3/2020 | Mahajan |
| 2020/0112455 | A1 | 4/2020 | Shoop et al. |
| 2020/0286474 | A1 | 9/2020 | Shoop et al. |
| 2020/0286503 | A1 | 9/2020 | Shoop et al. |
| 2020/0287632 | A1 | 9/2020 | Shoop et al. |
| 2020/0319845 | A1 | 10/2020 | Shoop et al. |
| 2020/0356338 | A1 | 11/2020 | Shoop et al. |
| 2021/0235564 | A1 | 7/2021 | Shoop et al. |
| 2021/0241767 | A1 | 8/2021 | Shoop et al. |
| 2021/0255827 | A1 | 8/2021 | Shoop et al. |
| 2021/0319794 | A1 | 10/2021 | Shoop et al. |
| 2023/0155691 | A1 | 5/2023 | Shoop et al. |
| 2023/0328864 | A1 | 10/2023 | Shoop et al. |
| 2023/0361886 | A1 | 11/2023 | Shoop et al. |
| 2024/0345802 | A1 | 10/2024 | Shoop et al. |
| 2025/0078833 | A1 | 3/2025 | Shoop et al. |
| 2025/0350375 | A1 | 11/2025 | Shoop et al. |

FOREIGN PATENT DOCUMENTS

| | | |
|---|---|---|
| WO | 2020185636 A1 | 9/2020 |
| WO | 2020227339 A1 | 11/2020 |

OTHER PUBLICATIONS

U.S. Appl. No. 18/601,162, filed Mar. 11, 2024, David D. Shoop.

U.S. Appl. No. 17/355,849, filed Jun. 23, 2021, David D. Shoop.

U.S. Appl. No. 18/139,625, filed Apr. 26, 2023, David D. Shoop.

Anonymous, "Secret Ultrasonic Commands Can Control Your Smartphone, Say Researchers", MIT Technology Review, https://www.technologyreview.com/2017/09/11/4049/secret-ultrasonic-commands-can-control-your-smartphone-say-researchers/ (2017) (8 pages).

He, et al. "Canceling inaudible voice commands against voice control systems," The 25th Annual International Conference on Mobile Computing and Networking. 2019. (2019) (15 pages).

LISNR Case Studies Lisnr/The Data-Over-Audio Leader, Discovery Channel. https://lisnr.com/resources/case-studies/, Oct. 15, 2018 (Last visited Mar. 8, 2019) (1 page).

Zhang et al. "Dolphinattack: Inaudible voice commands." Proceedings of the 2017 ACM SIGSAC conference on computer and communications security (2017) (15 pages).

Roy, Nirupam, et al. "Inaudible voice commands: The long-range attack and defense." 15th {USENIX} Symposium on Networked Systems Design and Implementation ({NSDI}18). 2018. (Year: 2018).

U.S. Appl. No. 18/732,274, filed Jun. 3, 2024, David D. Shoop.

U.S. Appl. No. 19/213,819, filed May 20, 2025, David D. Shoop.

U.S. Appl. No. 19/307,935, filed Aug. 22, 2025, David D. Shoop.

800

RECEIVE AN
INAUDIBLE
SIGNAL — 810

DETERMINE
TARGET DEVICES
BASED ON THE
INAUDIBLE
SIGNAL — 820

TRANSMIT A COMMAND SIGNAL
BASED ON THE INAUDIBLE
SIGNAL — 830

INAUDIBLE FREQUENCY ENVIRONMENTAL CONTROL

CROSS-REFERENCE TO RELATED APPLICATIONS

This application is a continuation of U.S. patent application Ser. No. 17/234,916, filed Apr. 20, 2021, which is a continuation of U.S. patent application Ser. No. 16/296,928, filed Mar. 8, 2019, now U.S. Pat. No. 11,011,169. The disclosures of each referenced application are hereby incorporated by reference herein in their entireties.

TECHNICAL FIELD

This disclosure relates to systems and methods for interfacing with electronic devices using inaudible frequencies.

BACKGROUND

Electronic devices, such as voice-activated electronic devices, do not act unless activated by an audible wake word. These audible wake words detract from natural interactions between users and the voice-activated electronic devices. To remove the burden from the user to activate the voice-activated electronic device, it would be desirable to silently activate the voice-activated electronic device. It would be desirable to activate the voice-activated device using a non-interfering communication such that the content for user consumption is not interrupted. It would also be desirable for the system to distinguish audio cues from the content and from the user. It would also be desirable to ensure that the voice-activated electronic device perform the specific function intended by the user. It would also be desirable for the system to communicate without requiring prior pairing with the voice-activated electronic device.

SUMMARY

Disclosed herein are implementations of systems and methods for interfacing with electronic devices using inaudible frequencies paired with audible frequencies. In an example, inaudible frequencies may be used in an advertisement context to allow a user to naturally and seamlessly interact with content to receive information regarding a particular product. In an example, inaudible frequencies may be used in an audiobook context to allow a user to naturally and seamlessly interact with the audiobook to control the direction of the story. In an example, inaudible frequencies may be used in a camera system to allow a user to naturally and seamlessly alert law enforcement of a potential intruder.

In an aspect, a method may include receiving an audio input. The method may include detecting an inaudible signal. The inaudible signal may be associated with a first audible signal of the audio input. The inaudible signal may include a frequency signature. The frequency signature may be associated with an electronic device type and may be used to distinguish between different types of electronic devices, for example, by manufacturer. The method may include activating a response monitor. The response monitor may be activated for a predetermined time. The response monitor may be activated responsive to the frequency signature. The method may include determining a content characteristic of the first audible signal. Determining the content characteristic of the first audible signal may be based on the inaudible signal. The method may include generating a message. The message may be based on the content characteristic. The method may include transmitting the message. The message may be transmitted on a condition that a second audible signal corresponds to the message and is received within the predetermined time.

In an aspect, an electronic device may include a receiver, a processor, and a transmitter. The receiver may be configured to receive an audio input. The receiver may be configured to detect an inaudible signal associated with a first audible signal of the audible input. The inaudible signal may include a frequency signature. The frequency signature may be associated with an electronic device type and may be used to distinguish between different types of electronic devices, for example, by manufacturer. The processor may be configured to activate a response monitor. The response monitor may be activated for a predetermined time. The response monitor may be activated responsive to the frequency signature. The processor may be configured to determine a content characteristic of the first audible signal. The processor may determine the content characteristic of the first audible signal based on the inaudible signal. The processor may be configured to generate a message. The message may be generated based on the content characteristic. The transmitter may be configured to transmit the message. The transmitter may transmit the message on a condition that a second audible signal corresponds to the message and is received within the predetermined time.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Typical systems for interactive content consumption require a user to perform multiple steps to activate an electronic device in the context of the content, resulting in a disjointed and undesirable user experience. The embodiments disclosed herein may augment user interaction with content by providing seamless communication between content devices and other electronic devices using inaudible frequencies. The inaudible frequencies enable a non-intrusive and distinct path for electronic device commands without requiring the user to activate the electronic device to initiate the path.

Figure 1:
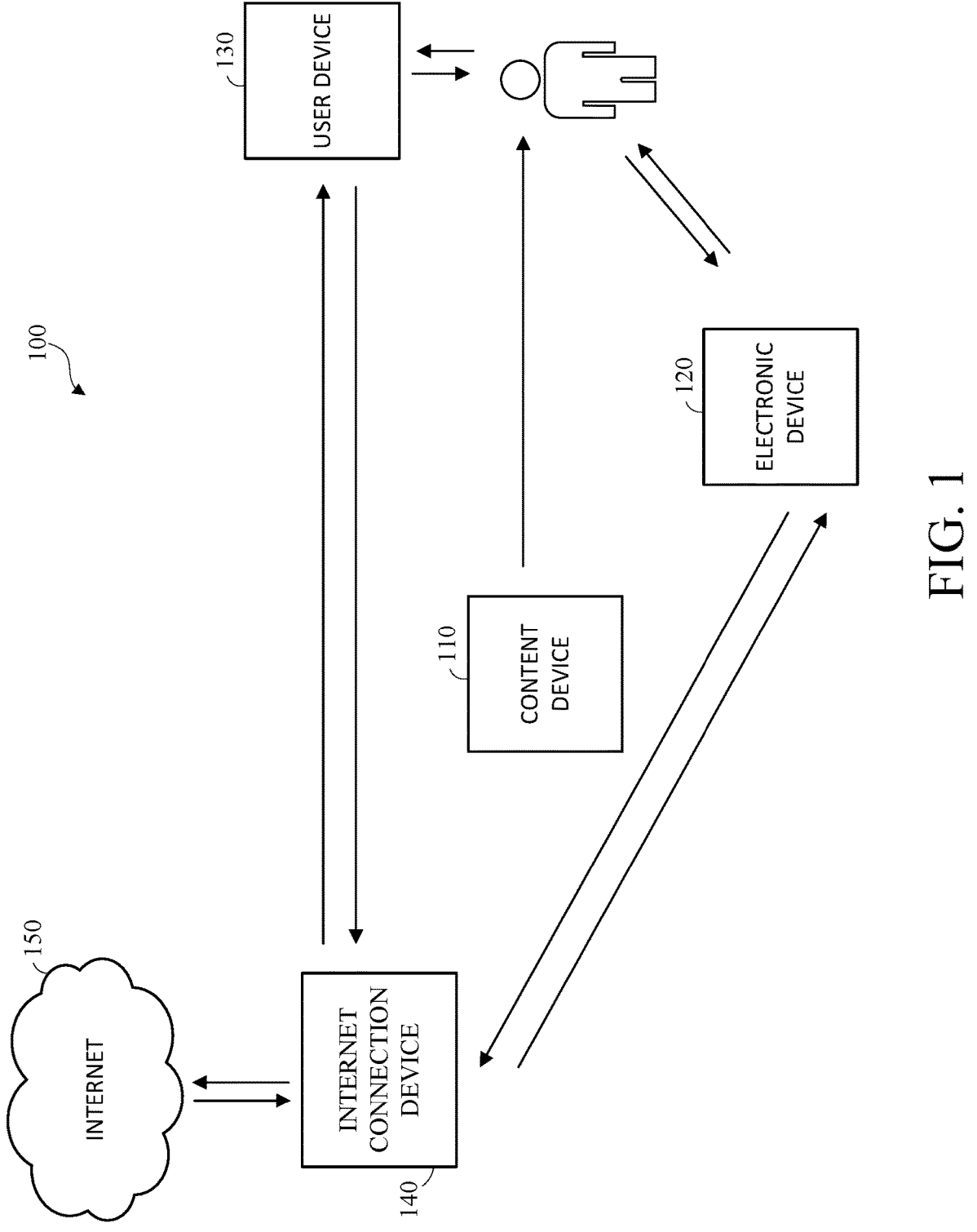
FIG. 1 is a block diagram of an example of a system for content consumption.

FIG. 1 is a block diagram of an example of a system 100 for content consumption. System 100 includes a content device 110, an electronic device 120, and a user device 130. The electronic device 120 is configured to communicate with the user and an internet connection device 140. The internet connection device 140 is configured to communicate with the user device 130 and internet 150.

The content device 110 is configured to transmit content to the user. Examples of the content device 110 include, and are not limited to, a television (TV), a personal computer (PC), a tablet, a mobile phone, a gaming device, a satellite receiver, a terrestrial radio receiver, an audio receiver, a set-top-box (STB), a speaker, a camera, a personal wearable device, or an augmented reality/virtual reality (AR/VR) device. The content may include audio content, video content, or both. Audio content may include streaming audio, recorded audio, broadcast audio, point-to-point audio, or any combination thereof. Video content may include streaming video, recorded video, broadcast video, point-to-point video, or any combination thereof. The audio content, video content, or both, may be in real-time, time shifted or pre-recorded.

The electronic device 120 may be any device configured to interface with the user. The electronic device 120 may include multi-mode capabilities, and may include multiple transceivers for communicating with different wireless networks over different wireless links. For example, the electronic device 120 may be configured to communicate with a device employs a Bluetooth radio technology, and with a base station that employs an IEEE 802 radio technology. For example, the electronic device 120 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, an AR/VR device, or any device configured to interface with the user.

The user device 130 may be any device configured to interface with the user. The user device 130 may include multi-mode capabilities, and may include multiple transceivers for communicating with different wireless networks over different wireless links. For example, the user device 130 may be configured to communicate with a base station that employs a cellular-based radio technology, and with the base station that employs an Institute of Electrical and Electronics Engineers (IEEE) 802 radio technology. The user device 130 may include, for example, a PC, a tablet, a mobile phone, a gaming device, a personal wearable device, an AR/VR device, or any device configured to interface with the user.

The internet connection device 140 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 140 may communicate with the content device 110, electronic device 120, user device 130, or any combination thereof, over an air interface, which may be any suitable wireless communication link, for example, radio frequency (RF), microwave, infrared (IR), ultraviolet (UV), visible light, and the like. The internet connection device 140 may implement a radio technology such as IEEE 802.11 to establish a wireless local area network (WLAN). The internet connection device 140 may implement a radio technology such as IEEE 802.15 to establish a wireless personal area network (WPAN). The internet connection device 140 may utilize a cellular-based access technology. Example cellular-based access technologies include wide-band code division multiple access (WCDMA), Global System for Mobile communications (GSM), Long Term Evolution (LTE), LTE-Advanced (LTE-A), and the like. As shown in FIG. 1, the internet connection device 140 may have a direct connection to the Internet 150. Alternatively, the internet connection device 140 may access the Internet 150 via a core network (not shown). The Internet 150 may include a global system of interconnected computer networks and devices that use common communication protocols, such as the transmission control protocol (TCP), user datagram protocol (UDP) and the internet protocol (IP) in the TCP/IP internet protocol suite.

Figure 2:
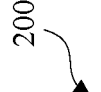
FIG. 2 is a block diagram of an example of an electronic device capable of receiving audible and inaudible inputs in accordance with one or more embodiments of this disclosure.
Figure 2:
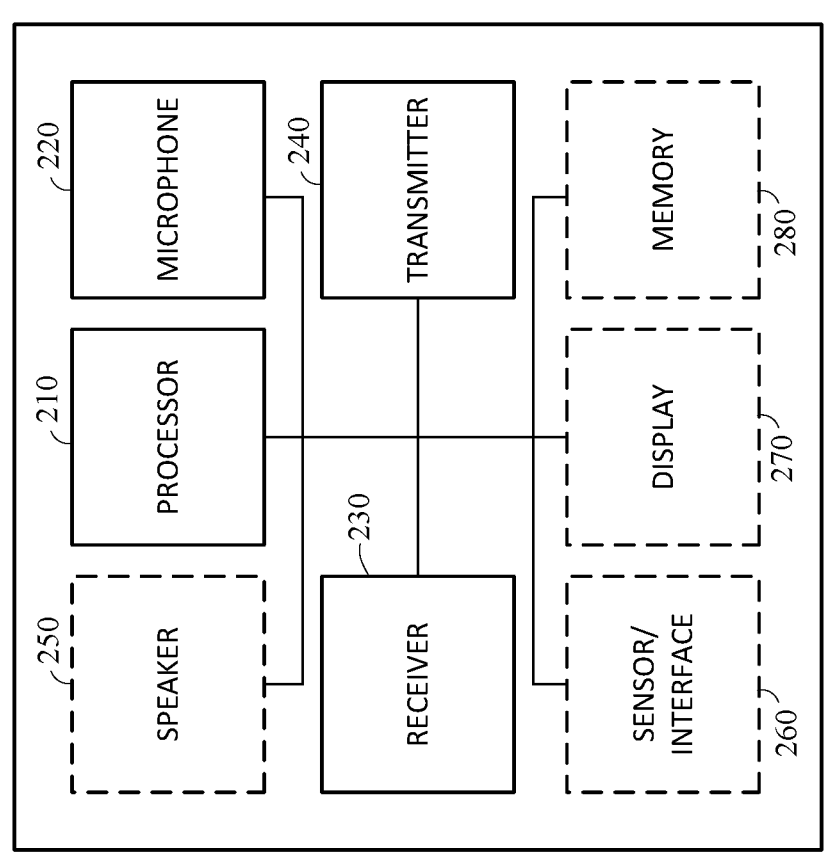

FIG. 2 is a block diagram of an example of an electronic device 200 capable of receiving audible and inaudible inputs. Example implementations of the electronic device 200 may include the content device 110, electronic device 120, and the user device 130 of FIG. 1. The electronic device 200 includes a processor 210, a microphone 220, a receiver 230, and a transmitter 240. In some implementations, the receiver 230 and transmitter 240 may be combined into a single transceiver unit. In some implementations, the electronic device 200 may include a speaker 250, a sensor/interface 260, a display 270, a memory 280, or any combination thereof.

The processor 210 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 210 may perform signal coding, data processing, power control, input/output processing, and/or any other functionality that enables the electronic device 200 to operate. The processor 210 may be coupled to the receiver 230 and the transmitter 240. While FIG. 2 depicts the processor 210, the receiver 230, and the transmitter 240 as separate components, it will be appreciated that the processor 210, the receiver 230, and the transmitter 240 may be integrated together in an electronic package or chip.

The microphone 220 is coupled to the processor 210 and may be configured to receive audible and inaudible inputs. The microphone 220 may include multiple microphones to extend the coverage area of audio capture. An audible input may include any audible signals at frequencies perceptible to a human ear from about 20 Hz to about 20,000 Hz. An inaudible input may include any inaudible signals at frequencies that are not perceptible to the human ear from below 20 Hz and above 20,000 Hz. The microphone 220 may be configured to detect any auditory command, for example, a user voice as a user input.

The receiver 230 may be configured to receive signals from an internet connection device, for example internet connection device 140 shown in FIG. 1. In some embodiments, the receiver 230 may be an antenna configured to receive inaudible inputs such as RF signals. In some embodiments, the receiver 230 may be a detector configured to receive inaudible inputs such as IR, UV, or visible light signals, for example. In some embodiments, the receiver 230 may be configured to receive both RF and light signals. It will be appreciated that the receiver 230 may be configured to receive any combination of wireless signals.

The transmitter 240 may be configured to transmit signals to an internet connection device, for example internet connection device 140 shown in FIG. 1. In some embodiments, the transmitter 240 may be an antenna configured to transmit RF signals. In some embodiments, the transmitter 240 may be an emitter configured to transmit IR, UV, or visible light signals, for example. In some embodiments, the transmitter 240 may be configured to transmit both RF and light signals. It will be appreciated that the transmitter 240 may be configured to transmit any combination of wireless signals.

The speaker 250 may be coupled to the processor 210 and may be configured to emit audible and inaudible signals. The speaker 250 may include multiple speakers to extend the sound field.

The sensor/interface 260 may be coupled to the processor 210 and may include one or more software and/or hardware modules that provide additional features, functionality and/or wired or wireless connectivity. For example, the sensor/interface 260 may include an accelerometer, an e-compass, a satellite transceiver, an image sensor (for photographs or video), a universal serial bus (USB) port, a vibration device, a television transceiver, a hands free headset, a Bluetooth® module, a frequency modulated (FM) radio unit, a digital music player, a media player, a video game player module, a keyboard, an Internet browser, and the like. The sensor/interface 260 may be configured to detect motion-based or gesture-based commands. The sensor/interface 260 may be configured to perform facial recognition. For example, facial recognition may be used to correlate a user response to a specific user and to determine which user responses to ignore. For example, if a user is not recognized via facial recognition, a response from that user may be ignored. In some implementations, the sensor/interface 260 may be configured to detect a sign gate or a walk gate of a user to identify the user. A sign gate may function as a virtual fingerprint of a user based on how the user performs specific gestures or signs. A walk gate may function as a virtual fingerprint of a user based on a unique walking gate of the user.

The display 270 may be coupled to the processor 210 and may be a liquid crystal display (LCD) display unit, a light emitting diode (LED) display unit, or an organic light-emitting diode (OLED) display unit. The display 270 may be configured to receive user input, for example, the display 270 may be a capacitive touch display in some embodiments.

The memory 280 may be coupled to the processor 210. The memory 280 may include volatile memory, persistent storage, or both. Volatile memory may include random access memory (RAM), dynamic random access memory (DRAM), static random access memory (SRAM), and the like. Persistent storage may include read-only memory (ROM), a hard disk, or any other type of memory storage device. Persistent storage may include a removable storage element such as a memory stick, a secure digital (SD) memory card, and the like.

Figure 3:
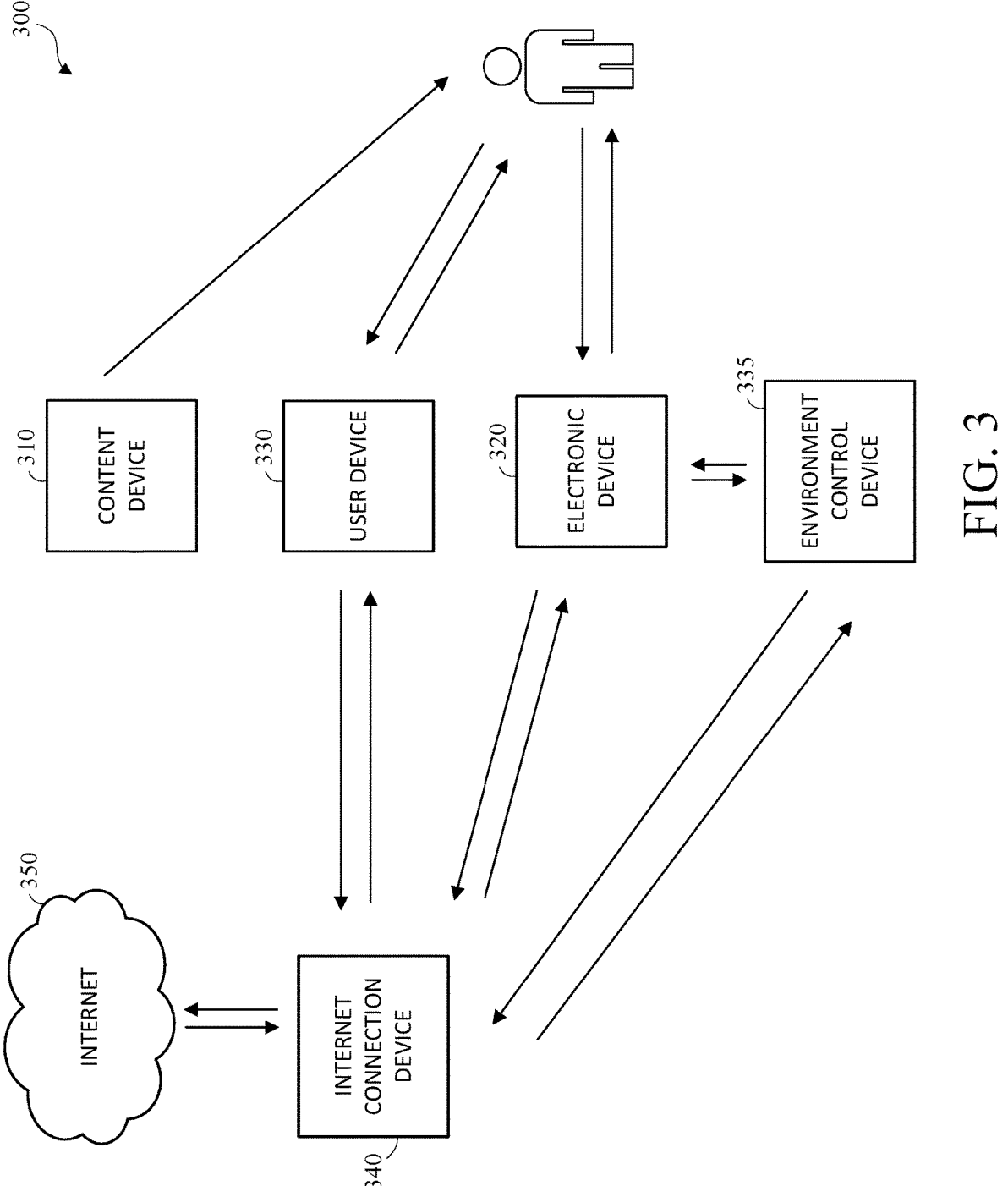
FIG. 3 is a block diagram of an example of a system for interactive content consumption in accordance with one or more embodiments of this disclosure.

FIG. 3 is a block diagram of an example of a system 300 for interactive content consumption. The system 300 includes a content device 310, an electronic device 320, a user device 330, and an environment control device 335. The electronic device 320 is configured to communicate with the user, the content device 310, the environment control device 335, and an internet connection device 340. The internet connection device 340 is configured to communicate with the content device 310, the electronic device 320, the user device 330, the environmental control device 335, the internet 350, or any combination thereof. The content device 310, the electronic device 320, the user device 330, and the environment control device 335 may each include one or more components of the electronic device 200 shown in FIG. 2.

The system 300 is configured to detect an inaudible signal in content that is presented to a user and queue the electronic device 320 to respond in context of the content. The system 300 may generate one or more possible responses based on the context of the content. The system 300 goes beyond activating the electronic device 320 to be ready to detect a user response by activating a response monitor in the context of the content, a specific activity, software application, service, or any combination thereof. The system 300 may allow the user to naturally respond to an audible or visual prompt by associating an inaudible signal with an audible or visual signal. The system 300 may enhance user interactivity by setting the electronic device 320 to be in a prepared state for a specific context without the user having to provide the context. The system 300 is configured to communicate using inaudible signals without requiring prior pairing between the content device 310 and the electronic device 320. In some embodiments, the system 300 may be configured to control an environmental condition based on the context of the content.

Referring to FIG. 3, the content device 310 is configured to transmit content to the user. Examples of the content device 310 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content identifier (ID), a source ID, or any combination thereof. The frequency signature may be the frequency at which the inaudible signal is transmitted. The frequency at which the content is transmitted may be one example to avoid constructive interference, destructive interference, or both. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command, instruction, or both, may be unique to the system that will receive the wake command The wake command is used to wake the electronic device to hold the microphone and/or other peripherals open for input from the user and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user. The source device may be the content device 310, the user device 330, the environmental control device 335, or any combination thereof.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

The electronic device 320 may be any device configured to interface with the user. The electronic device 320 may include multi-mode capabilities, and may include multiple transceivers for communicating with different wireless networks over different wireless links. For example, the electronic device 320 may be configured to communicate with a device employs a Bluetooth radio technology, Zigbee technology, Z-wave technology, infrared (IR) technology, cellular technology, WiMAX technology, and with a base station that employs an IEEE 802 radio technology. For example, the electronic device 320 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a clock, a mirror, a robotic device, a vehicle, a personal wearable device, or an AR/VR device.

The electronic device 320 may receive an audio input. The audio input may include an audible signal, an inaudible signal, or both. In an example, the electronic device 320 may be configured to detect an inaudible signal in the audio input, for example the inaudible signal from the content device 310. The electronic device 320 may have a service associated with the electronic device 320 that may be configured to contact a service associated with the content device 310 via a service adapter (not shown). A service may include any system that is capable of transmitting wired or wireless content, including, for example, terrestrial audio/video service, satellite audio/video service, and web-based service. A web-based service may be a service that provides a system for applications or computers to communicate with each other over the World Wide Web. The web-based service may include machine-to-machine communications. The content device 310, via the service associated with the content device 310, may be configured to validate a user account and associate the user account with a user. The service associated with the content device 310 may be configured to open a communication link with the service associated with the electronic device 320. The electronic device 320, via the service associated with the electronic device 320, may be configured to transmit a content ID to the service associated with the content device 310. The electronic device 320 may be configured to activate a response monitor. Activating the response monitor may include activating a microphone, for example microphone 220 shown in FIG. 2. Activating the response monitor may be responsive to a frequency signature of the inaudible signal. The electronic device 320 may activate the response monitor for a predetermined time. The response monitor may be a voice response monitor that is configured to monitor audio inputs for a user input in the form of a voice input. In an example, by activating the response monitor, the electronic device 320 may listen for one or more predetermined user responses and queue a contextual response based on the audio input. In another example, by activating the response monitor, the electronic device 320 may monitor an audio input for a user response, queue a contextual response based on the audio input, and determine whether the user response corresponds to the contextual response. For example, the electronic device 320 may determine a content characteristic of the audible signal based on the inaudible signal. The electronic device 320 may be configured to generate a message based on the content characteristic. The generated message may be a contextual response. The electronic device 320 may be configured to transmit the message if the electronic device 320 determines that the user response corresponds to the message. In some embodiments, the electronic device 320 may be configured to transmit a command signal to the environment control device to control an environmental condition. The command signal may be based on a content characteristic, for example, the content characteristic may include a content context of an audio portion of the content, a video portion of the content, or both.

The user device 330 may be any device configured to interface with the user. The user device 330 may include multi-mode capabilities, and may include multiple transceivers for communicating with different wireless networks over different wireless links. For example, the user device 330 may be configured to communicate with a base station that employs a cellular-based radio technology, and with the base station that employs an IEEE 802 radio technology. The user device 330 may include, for example, a PC, a tablet, a mobile phone, a gaming device, a speaker, a camera, a clock, a mirror, a robotic device, a vehicle, a personal wearable device, or an AR/VR device.

The environment control device 335 may be configured to receive a command signal from the electronic device 320 to control an environmental condition. The command signal may be receive from any device directly or indirectly, for example, via a web-based service using machine-to-machine communications. The environment control device may 335 may include a lighting device, a thermostat, a camera, a wearable article, an aroma dispersion device, a furniture article, or any type of feedback platform that provides visual, auditory, haptic, vibration, tactile, aromatic, flavor, or any sensory or spatial effect. An environmental condition may include a lighting condition, a temperature condition, a humidity condition, an aromatic condition, a flavor condition, a pressure condition, vibration condition, a motion condition, a tilt condition, or any sensory condition and the like. The command signal may be based on a content characteristic. The content characteristic, for example, may include a content context of an audio portion of the content, a video portion of the content, or both. For example, if the user is viewing content that includes a thunderstorm, the electronic device 320 may send a command signal to a lighting device that causes the lights to flash, send a command signal to a furniture article that causes a chair that the user is occupying to shake, send a command signal to a thermostat to reduce the room temperature, or any combination thereof to provide the user with an immersive experience while viewing the content.

The internet connection device 340 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 340 may communicate with the user device 330 over an air interface, which may be any suitable wireless communication link, for example, RF, microwave, IR, UV, visible light, and the like. The internet connection device 340 may implement a radio technology such as IEEE 802.11 to establish a WLAN. The internet connection device 340 may implement a radio technology such as IEEE 802.15 to establish a WPAN. The internet connection device 340 may utilize a cellular-based access technology. Example cellular-based access technologies include WCDMA, GSM, LTE, LTE-A, and the like. As shown in FIG. 3, the internet connection device 340 may have a direct connection to the Internet 350. Alternatively, the internet connection device 340 may access the Internet 350 via a core network (not shown). The Internet 350 may include a global system of interconnected computer networks and devices that use common communication protocols, such as the TC, UDP and the IP in the TCP/IP internet protocol suite.

In a typical situation, a user is required to perform multiple steps to activate an electronic device such as a voice assistant in the context of the content being consumed. For example, the user may be consuming video content that includes an advertisement for a particular product. The audio portion of the video content may ask the user whether they want to learn more about the particular product. Typically, the user would have to invoke a wake command for the electronic device and then ask the device about the particular product. In this situation, it is not uncommon that the user says the wrong product or that the electronic device does not correctly interpret the voice command and retrieves information relating to a different product. Implementing an inaudible signal that is paired or associated with the audio portion of the video content in this example would allow the user to interact with the electronic device with a natural response, without invoking a wake command, and also provide that the information retrieved is for the correct product.

Figure 4:
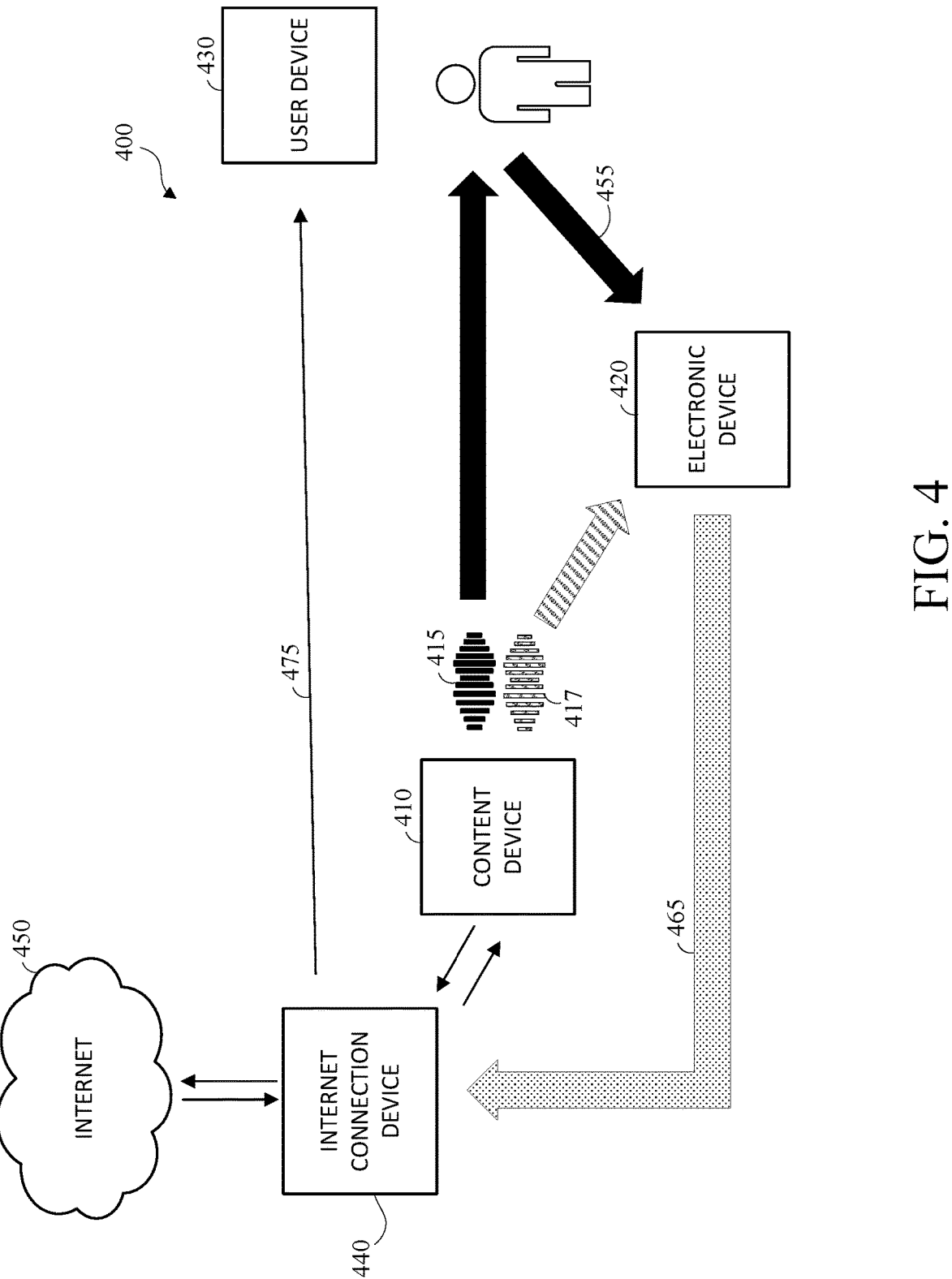
FIG. 4 is a block diagram of an example of a system for interfacing with electronic devices using inaudible frequencies paired with audible frequencies in accordance with one or more embodiments of this disclosure.

FIG. 4 is a block diagram of an example of a system 400 for interfacing with electronic devices using inaudible frequencies paired with audible frequencies. The system 400 includes a content device 410, an electronic device 420, and a user device 430. The electronic device 420 is configured to communicate with the user, the content device 410, and an internet connection device 440. The internet connection device 440 is configured to communicate with the user device 430 and internet 450. The content device 410, the electronic device 420, and the user device 430 may each include one or more components of the electronic device 200 shown in FIG. 2.

The system 400 is configured to detect an inaudible signal in content that is presented to a user and queue the electronic device 420 to respond in context of the content. The system 400 may generate one or more possible responses based on the context of the content. The system 400 goes beyond activating the electronic device 420 to be ready to detect a user response by activating a response monitor in the context of the content, a specific activity, software application, or any combination thereof. The system 400 may allow the user to naturally respond to an audible or visual prompt by associating an inaudible signal with an audible or visual signal. The system 400 may enhance user interactivity by setting the electronic device 420 to be in a prepared state for a specific context, for example an advertising context, without the user having to provide the context. For example, associating an inaudible signal with an audible signal may allow the user to interact with content without having to use a wake command. The system 400 is configured to communicate using inaudible signals without requiring prior pairing between the content device 410 and the electronic device 420. In some embodiments, the system 400 may be configured to control an environmental condition based on the context of the content.

Referring to FIG. 4, the content device 410 is configured to transmit content to the user. Examples of the content device 410 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 4, the content device 410 is configured to transmit content to a user. The content may include audio content, video content, or both. The audio content may include audible signals, inaudible signals, or both. For example, the audio content may include an audible signal 415 (shown in solid black) that is paired or associated with an inaudible signal 417 (shown in cross-hatching). The audible signal 415 may include an audible advertisement that is intended to elicit a response from the user. The inaudible signal 417 may be paired with or associated with the audible signal 415. The inaudible signal 417 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

The electronic device 420 may be any device configured to interface with the user and a source device. The electronic device 420 may include multi-mode capabilities, and may include multiple transceivers for communicating with different wireless networks over different wireless links. For example, the electronic device 420 may be configured to communicate with a device employs a Bluetooth radio technology, and with a base station that employs an IEEE 802 radio technology. For example, the electronic device 420 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

The electronic device 420 may receive an audio input. The audio input may include an audible signal, an inaudible signal, or both. In an example, the electronic device 420 may be configured to detect an inaudible signal in the audio input, for example the inaudible signal 417 from the content device 410. The electronic device 420 may have a service associated with the electronic device 420 that may be configured to contact a service associated with the content device 410 via a service adapter (not shown). A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 410, via the service associated with the content device 410, may be configured to validate a user account and associate the user account with a user. The service associated with the content device 410 may be configured to open a communication link with the service associated with the electronic device 420. The electronic device 420, via the service associated with the electronic device 420, may be configured to transmit a content ID to the service associated with the content device 410. The electronic device 420 may be configured to activate a response monitor. Activating the response monitor may include activating a microphone, for example microphone 220 shown in FIG. 2. In some implementations, activating the response monitor may include activating a sensor to detect a user gesture. Activating the response monitor may be responsive to a frequency signature of the inaudible signal 417, the wake command of the inaudible signal 417, or both. The electronic device 420 may activate the response monitor for a predetermined time. The response monitor may be a voice response monitor that is configured to monitor audio inputs for a user response 455. The user response 455 may be a voice input, a gesture, a text input, a touch input, or any suitable input. In an example, by activating the response monitor, the electronic device 420 may monitor audio inputs for one or more predetermined user responses and queue a contextual response based on the audio input, for example, the user response 455 to the advertisement. In another example, by activating the response monitor, the electronic device 420 may monitor an audio input for a user response 455, queue one or more contextual responses based on the audio input, and determine whether the user response 455 corresponds to the one or more contextual responses. For example, the electronic device 420 may determine a content characteristic of the advertisement in audible signal 415 based on the inaudible signal 417. The electronic device 420 may be configured to generate one or more messages based on the content characteristic of the advertisement. Each generated message may be a contextual response to the advertisement. The electronic device 420 may be configured to transmit the one or more messages if the electronic device 420 determines that the user response 455 corresponds to at least one of the one or more messages. The electronic device 420 may be configured to transmit the message 465 (shown in stippling) to internet connection device 440. The message 465 may be transmitted using RF or any suitable wired or wireless communication link.

The internet connection device 440 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 440 may communicate with the electronic device 420, the user device 430, or both, over an air interface, which may be any suitable wireless communication link, for example, RF, microwave, IR, UV, visible light, and the like. The internet connection device 440 may implement a radio technology such as IEEE 802.11 to establish a WLAN. The internet connection device 440 may implement a radio technology such as IEEE 802.15 to establish a WPAN. The internet connection device 440 may utilize a cellular-based access technology. Example cellular-based access technologies include WCDMA, GSM, LTE, LTE-A, and the like. As shown in FIG. 4, the internet connection device 440 may have a direct connection to the Internet 450. Alternatively, the internet connection device 440 may access the Internet 450 via a core network (not shown). The Internet 450 may include a global system of interconnected computer networks and devices that use common communication protocols, such as the TC, UDP and the IP in the TCP/IP internet protocol suite.

The internet connection device 440 may receive the message 465 and retrieve information regarding the advertisement based on the user response 455. The information regarding the advertisement may be retrieved from the internet 450. The information regarding the advertisement may be for a specific product or service based on the content ID. The internet connection device 440 may transmit the retrieved information 475 to the user device 430. The information regarding the advertisement may be transmitted to the user device 430 without the user having to use any wake commands while interacting with the content.

The user device 430 may be configured to interface with the user. The user device 430 may include multi-mode capabilities, and may include multiple transceivers for communicating with different wireless networks over different wireless links. For example, the user device 430 may be configured to communicate with a base station that employs a cellular-based radio technology, and with the base station that employs an IEEE 802 radio technology. The user device 430 may include, for example, a PC, a tablet, a mobile phone, a gaming device, a personal wearable device, or an AR/VR device. The user device 430 may be configured to receive the information regarding the advertisement.

In another typical situation, a user is required to perform multiple steps to activate an electronic device such as a voice assistant in the context of a software application. For example, the user may be consuming content in the form of an audiobook. The audiobook may be an enhanced audiobook that includes a video portion and an audio portion. The audio portion of the audiobook may ask the user for input to direct the narration of the story. Typically, the user would have to invoke a wake command for the electronic device and then speak another voice command to instruct the electronic device to take an action. In this situation, having to invoke a wake command results in a disjointed and undesirable user experience. Implementing an inaudible signal that is paired or associated with the audio portion of the audiobook in this example would allow the user to interact with the electronic device with a natural response, without invoking a wake command, and also provide a seamless and enjoyable user experience.

Figure 5:
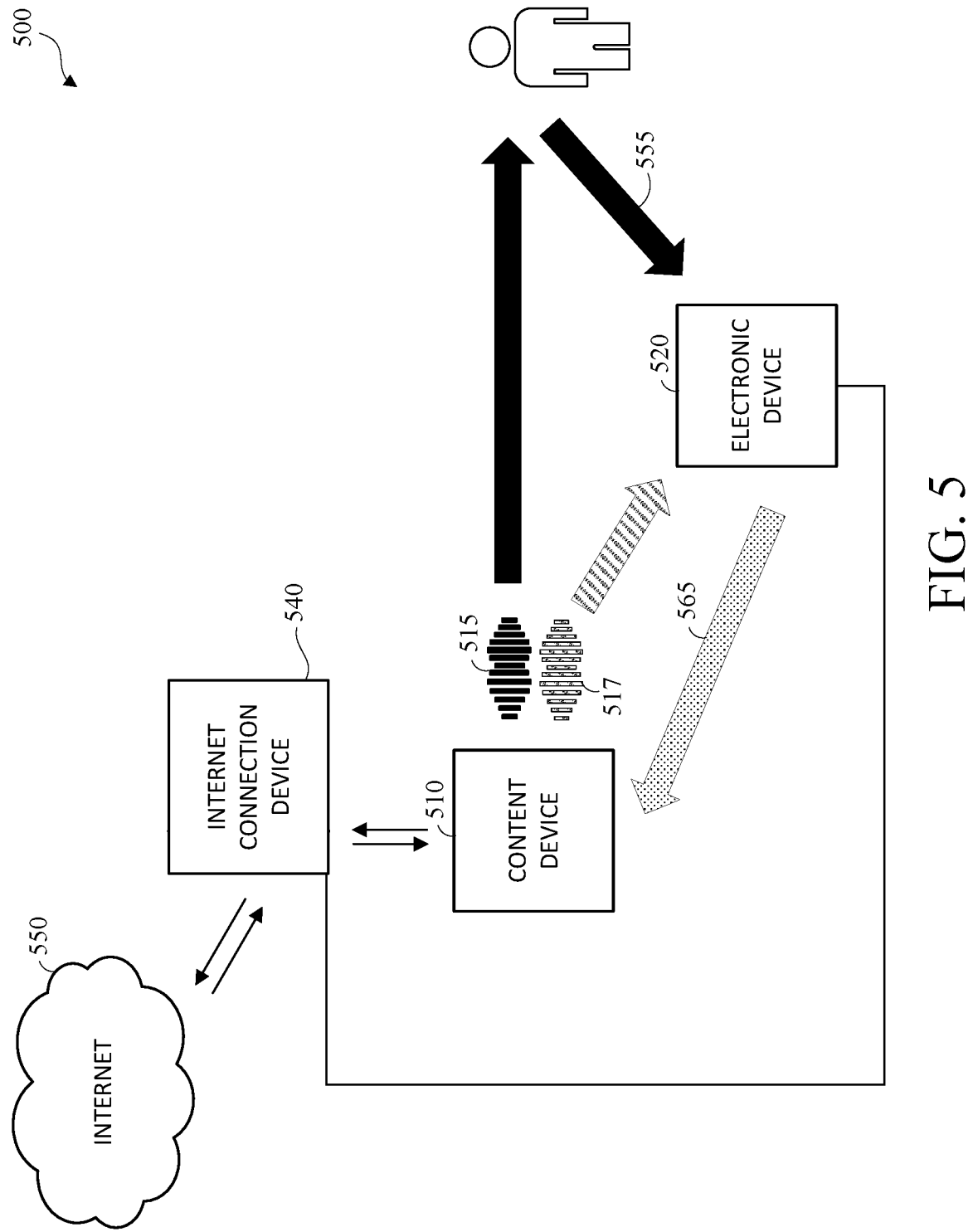
FIG. 5 is a block diagram of another example of a system for interfacing with electronic devices using inaudible frequencies paired with audible frequencies in accordance with one or more embodiments of this disclosure.

FIG. 5 is a block diagram of another example of a system 500 for interfacing with electronic devices using inaudible frequencies paired with audible frequencies. The system 500 includes a content device 510 and an electronic device 520. The electronic device 520 is configured to communicate with the user, the content device 510, and an internet connection device 540. The internet connection device 540 is configured to communicate with the content device 510, the electronic device 520, and internet 550. The content device 510 and the electronic device 520 may each include one or more components of the electronic device 200 shown in FIG. 2.

The system 500 is configured to detect an inaudible signal in content of an interactive content application that is presented to a user and queue the electronic device 520 to respond in context of the content. In some implementations, the system 500 may be configured to perform user-based polling. The system 500 may generate one or more possible responses based on the context of the content. Examples of interactive content applications include, and are not limited to, electronic book applications, audiobook applications, gaming applications, educational applications, video applications, and any application that provides a user a choice in the outcome of the content. The system 500 goes beyond activating the electronic device 520 to be ready to detect a user response by activating a response monitor in the context of the content, a specific activity, software application, or any combination thereof. The system 500 may allow the user to naturally respond to an audible or visual prompt by associating an inaudible signal with an audible or visual signal. The system 500 may enhance user interactivity by setting the electronic device 520 to be in a prepared state for a specific context, for example an audiobook context, without the user having to provide the context. For example, associating an inaudible signal with an audible signal may allow the user to interact with content without having to use a wake command. The system 500 is configured to communicate using inaudible signals without requiring prior pairing between the content device 510 and the electronic device 520. In some embodiments, the system 500 may be configured to control an environmental condition based on the context of the content.

Referring to FIG. 5, the content device 510 is configured to transmit content to the user. Examples of the content device 510 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 5, the content device 510 is configured to transmit content to a user. The content may include audio content, video content, or both. The audio content may include audible signals, inaudible signals, or both. For example, the audio content may include an audible signal 515 (shown in solid black) that is paired or associated with an inaudible signal 517 (shown in cross-hatching). The audible signal 515 may include an audible request that is intended to elicit a response from the user. The audible request may include a request to choose an option in the interactive content application, a polling question, or any audible word or phrase to elicit a user response. The inaudible signal 517 may be paired with or associated with the audible signal 515. The inaudible signal 517 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be a request and be used to determine a content characteristic, for example, a content context of the audible request. In an example, the content context may include an inference based on the content ID that may influence the meaning or effect of the audible request, the inaudible signal, a portion of the inaudible signal such as the instruction, or any combination thereof.

The electronic device 520 may be configured to interface with the user. The electronic device 520 may include multi-mode capabilities, and may include multiple transceivers for communicating with different wireless networks over different wireless links. For example, the electronic device 520 may be configured to communicate with a device employs a Bluetooth radio technology, and with a base station that employs an IEEE 802 radio technology. For example, the electronic device 520 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

The electronic device 520 may receive an audio input. The audio input may include an audible signal, an inaudible signal, or both. In an example, the electronic device 520 may be configured to detect an inaudible signal in the audio input, for example the inaudible signal 517 from the content device 510. The electronic device 520 may have a service associated with the electronic device 520 that may be configured to contact a service associated with the content device 510 via a service adapter (not shown). A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 510, via the service associated with the content device 310, may be configured to validate a user account and associate the user account with a user. The service associated with the content device 510 may be configured to open a communication link with the service associated with the electronic device 520. The electronic device 520, via the service associated with the electronic device 520, may be configured to transmit a content ID to the service associated with the content device 510. The electronic device 520 may be configured to activate a response monitor. Activating the response monitor may include activating a microphone, for example microphone 220 shown in FIG. 2. Activating the response monitor may be responsive to a frequency signature of the inaudible signal 517, the wake command of the inaudible signal 517, or both. The electronic device 520 may activate the response monitor for a predetermined time. The response monitor may be a voice response monitor that is configured to monitor audio inputs for a user response 555. The user response 555 may be a voice input, a gesture, a text input, a touch input, or any suitable input. In an example, by activating the response monitor, the electronic device 520 may monitor audio inputs for one or more predetermined user responses and queue a contextual response based on the audio input, for example, the user response 555 to the audio input. In another example, by activating the response monitor, the electronic device 520 may monitor an audio input for a user response 555, queue a contextual response based on the audio input, and determine whether the user response 555 corresponds to the contextual response. For example, the electronic device 520 may determine a content characteristic of the audible signal 515 based on the inaudible signal 517. The electronic device 520 may be configured to generate one or more messages based on the content characteristic of the audible signal 515. Each generated message may be a contextual response to the audible signal 515. The electronic device 520 may be configured to transmit the one or more messages if the electronic device 520 determines that the user response 555 corresponds to at least one of the one or more messages. The message 565 may include an instruction. For example, in an interactive content application such as an audiobook, the instruction may command the interactive content application to jump to a particular page based on the user response 555. The electronic device 520 may be configured to transmit the message 565 (shown in stippling) to the content device 510 using RF or any suitable wired or wireless communication link. In some embodiments, the electronic device 520 may be configured to transmit the message 565 to internet connection device 540 using RF or any suitable wired or wireless communication link.

The internet connection device 540 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 540 may communicate with the content device 510, the electronic device 520, or both, over an air interface, which may be any suitable wireless communication link, for example, RF, microwave, IR, UV, visible light, and the like. The internet connection device 540 may implement a radio technology such as IEEE 802.11 to establish a WLAN. The internet connection device 540 may implement a radio technology such as IEEE 802.15 to establish a WPAN. The internet connection device 540 may utilize a cellular-based access technology. Example cellular-based access technologies include WCDMA, GSM, LTE, LTE-A, and the like. As shown in FIG. 5, the internet connection device 540 may have a direct connection to the Internet 550. Alternatively, the internet connection device 540 may access the Internet 550 via a core network (not shown). The Internet 550 may include a global system of interconnected computer networks and devices that use common communication protocols, such as the TC, UDP and the IP in the TCP/IP internet protocol suite.

The internet connection device 540 may receive the message 565 and retrieve information regarding the interactive content application based on the user response 555. The information regarding the interactive content application may be retrieved from the internet 550. The information regarding the interactive content application may be based on the content ID. The information regarding the interactive content application may be transmitted to the content device 510 without the user having to use any wake commands while interacting with the content.

Figure 6:
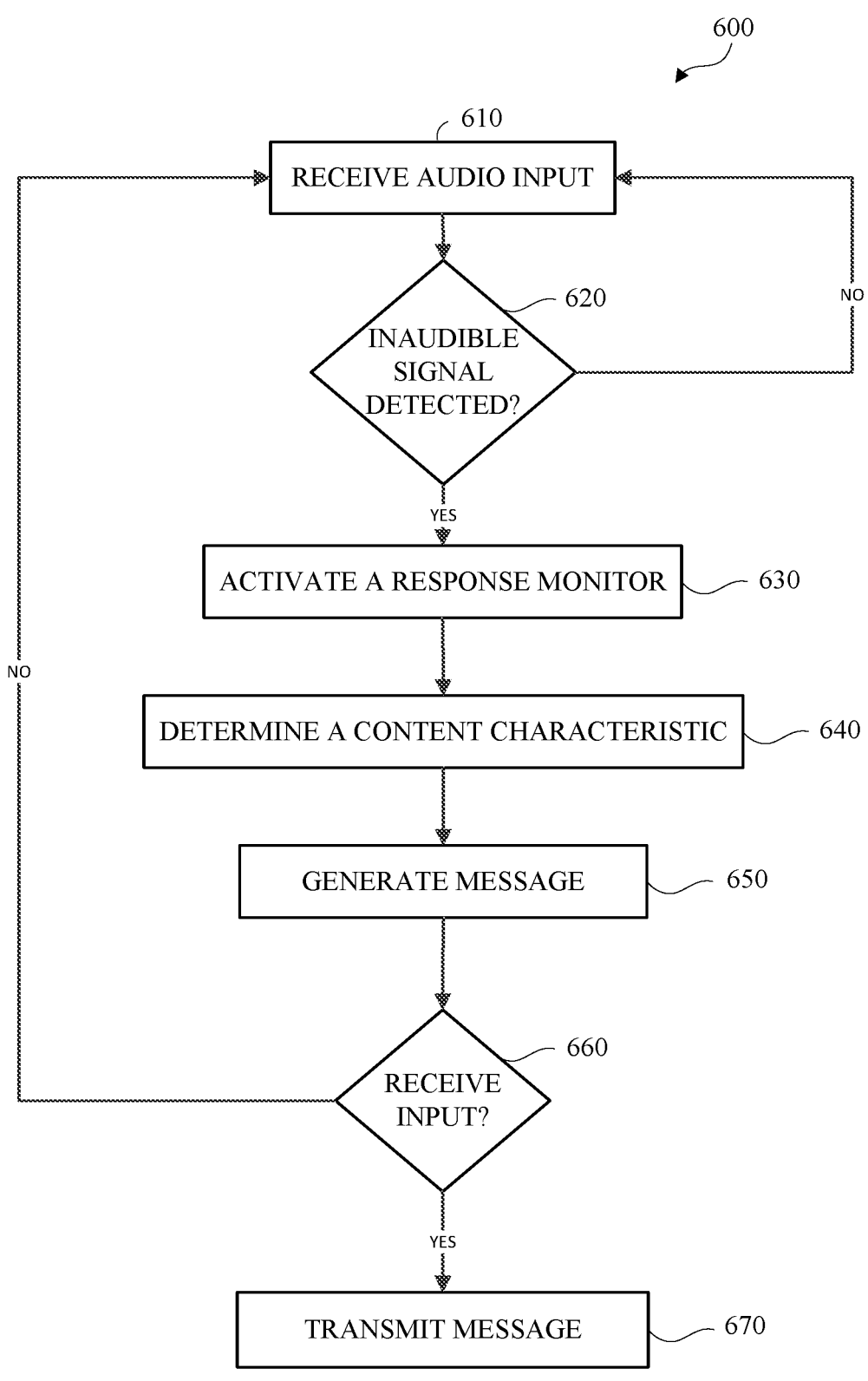
FIG. 6 is a flow diagram of an example of a method for waking voice-activated electronic devices in accordance with one or more embodiments of this disclosure.

FIG. 6 is a flow diagram of an example of a method 600 for waking voice-activated electronic devices. The method 600 includes receiving an audio input 610. The audio input may be associated with content, for example, audio content, video content, or both. The audio input may include an audible signal, an inaudible signal, or both. For example, the audio input may include an audible signal that is paired or associated with an inaudible signal. The audible signal and the inaudible signal may be separate signals or they may be a multiplexed signal. The inaudible signal may include a frequency signature, a wake command, an instruction, a content ID, a source ID, or any combination thereof.

The method includes determining whether an inaudible signal is detected 620. If an inaudible signal is not detected, the method 600 continues to receive audio input 610. If an inaudible signal is detected, the method 600 activates a response monitor 630. Activating a response monitor 630 may include activating a microphone, for example microphone 220 shown in FIG. 2. Activating the response monitor 630 may be responsive to a frequency signature of the inaudible signal, a wake command, or both. The response monitor may be activated for a predetermined time. The response monitor may be a voice response monitor for monitoring audio inputs for a user input in the form of a voice input.

The method 600 includes determining a content characteristic 640 of the audible signal based on the inaudible signal. The content characteristic, for example, may include a content context of an audio portion of the content, a video portion of the content, or both. The method 600 includes generating a message 650 based on the content characteristic. The generated message may be a contextual response. The method 600 includes determining whether an input is received. The input may be a voice input, a gesture, a text input, a touch input, or any suitable input. The method 600 includes transmitting the message 670 if an input is received. In an example, the message may be transmitted based on a determination that the input corresponds to the message If an input is not received, the method 600 continues to receive audio input 610.

In another typical situation, a user is required to perform multiple steps to activate an electronic device such as a voice assistant in the context of a hardware device. For example, the user may be alerted of a situation by a camera. In an example, the camera may observe a scene and detect a potential package delivery. The camera may transmit content to the user that includes a video portion and an audio portion. The audio portion of the content may ask the user for input to take an action. For example, the audio portion may ask the user whether they recognize the package, whether to confirm receipt of the package, or both. If the user indicates that they do not recognize the package, the sender, the delivery company, or both may be automatically notified that the package may have been misdelivered. Typically, the user would have to invoke a wake command for the electronic device and then speak another voice command to instruct the electronic device to take an action. In this situation, where time is critical, having to invoke a wake command results in a disjointed and undesirable user experience. Implementing an inaudible signal that is paired or associated with the audio portion of the content in this example would allow the user to interact with the electronic device with a natural response, without invoking a wake command, and also provide a seamless and near-instantaneous user experience.

Figure 7:
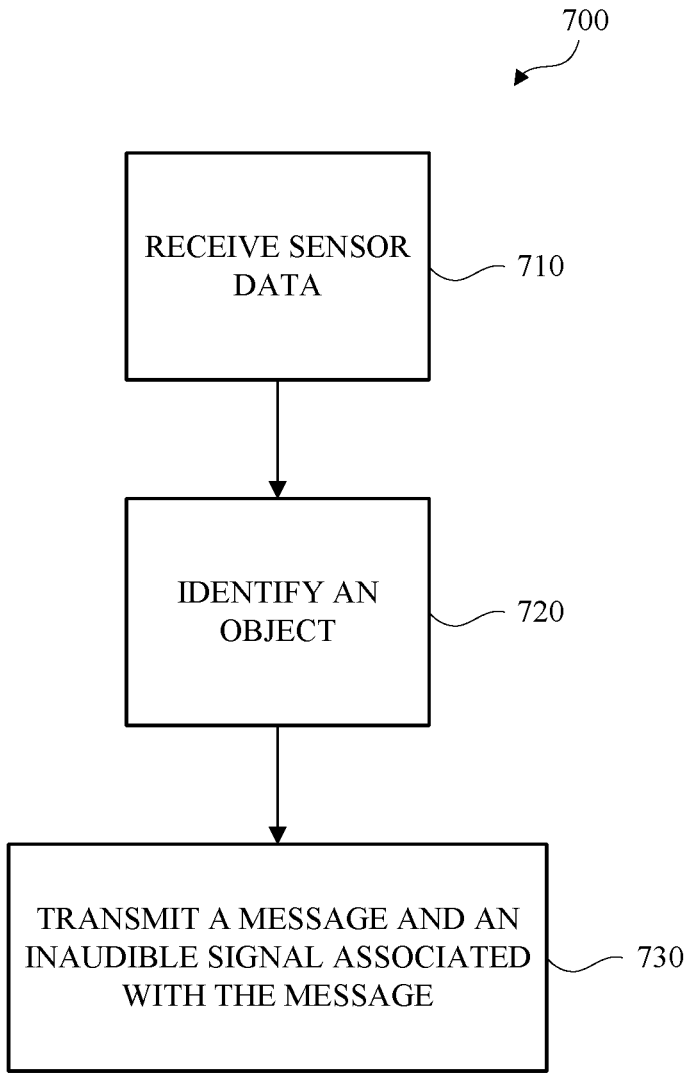
FIG. 7 is a flow diagram of another example of a method for waking voice-activated electronic devices in accordance with one or more embodiments of this disclosure.

FIG. 7 is a flow diagram of another example of a method 700 for waking voice-activated electronic devices. The method 700 may be implemented in any electronic device, for example a camera configured to capture content. The method 700 includes receiving 710 sensor data. The sensor data may include image data, for example photographic or video data. The method 700 includes identifying 720 an object in the image data. The method 700 includes transmitting 730 a message and an inaudible signal associated with the message. The message may be an alert to a user regarding an identified object or scenario in the image data that may require a user response. In an example, the message may include an image of the identified object and an inaudible signal associated with the identified object.

The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be based on an object or scenario identified in the image data and used to determine a content characteristic, for example, a content context of the image data. In an example, the content context may include an inference based on the content ID that may influence the meaning or effect of the image data. In an example of a video capture, the content characteristic may include a content context of an audio portion of the content, a video portion of the content, or both.

Figure 8:
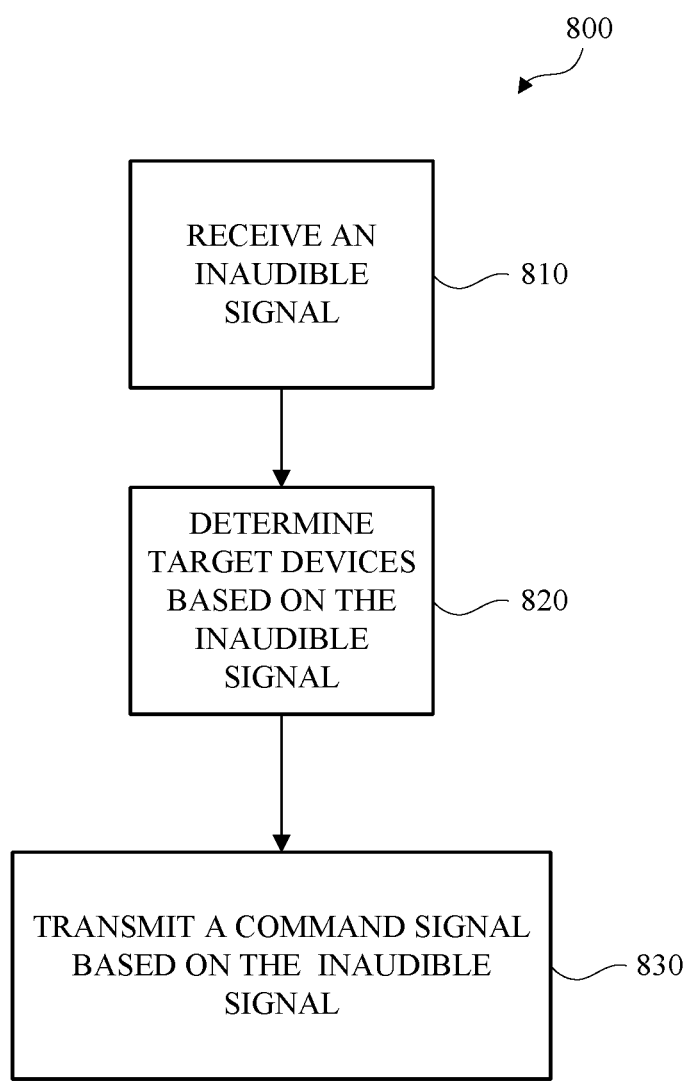
FIG. 8 is a flow diagram of an example of a method of environmental control in accordance with one or more embodiments of this disclosure.

FIG. 8 is a flow diagram of an example of a method 800 of environmental control. The method 800 includes receiving 810 an inaudible signal. The inaudible signal may be associated with content from a content device, for example content device 310 shown in FIG. 3. The method 800 includes determining 820 target devices based on the inaudible signal. Determining 820 target devices may include determining one or more available environmental control devices based on a content characteristic. For example, the content characteristic may include a content context of an audio portion of the content, a video portion of the content, or both. The method 800 includes transmitting 830 a command signal based on the inaudible signal. The command signal may be transmitted to one or more environmental control devices to control an environmental condition. The one or more environmental control devices may include a lighting device, a thermostat, a camera, a wearable article, an aroma device, a furniture article, or any type of feedback platform that provides haptic, vibration, tactile, or spatial effect.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A method, comprising:
detecting, by an electronic device, an inaudible signal emitted by a media device, wherein the inaudible signal identifies content characteristics of a content item that is being played by the media device;

based at least in part on the content characteristics identified by the inaudible signal, detecting, by the electronic device, an environmental condition in a vicinity of the media device;
selecting, by the electronic device, a target environmental control device for controlling the environmental condition based at least in part on the target environmental control device being capable of taking an environmental action matching the content characteristics, wherein the target environmental control device is selected from a plurality of environment control devices capable of different modes of environmental control located in the vicinity of the media device; and
transmitting, by the electronic device to the target environmental control device, an environmental command that causes the target environmental control device to modify the environmental condition.

2. The method of claim 1, wherein the inaudible signal comprises an inaudible wake command.

3. The method of claim 1, wherein the electronic device is a voice-activated electronic device.

4. The method of claim 1, wherein the target environment control device is at least one of: a lighting device, a thermostat, a camera, a wearable article, an aroma device, a furniture article, or a feedback platform that provides haptic, vibration, tactile, or spatial effect.

5. The method of claim 1, wherein the environmental command is further based on an audio input emitted by the media device.

6. The method of claim 1, wherein the environmental command is a contextual response based on a content characteristic of the content item played by the media device.

7. The method of claim 6, wherein the content characteristic comprises at least one of: a content context of an audio portion of the content item or a content context of a video portion of the content item.

8. The method of claim 1, wherein the detected environmental condition comprises at least one of: a lighting condition, a temperature condition, a humidity condition, an aromatic condition, a flavor condition, a pressure condition, vibration condition, a motion condition, or a tilt condition detected in the vicinity of the media device.

9. The method of claim 1, wherein the detected environmental condition is detected using a sensor interface connected to the electronic device, the sensor interface comprising at least one of:
a motion sensor;
a light sensor;
an accelerometer;
an e-compass;
a satellite transceiver;
an image sensor; or
a vibration device.

10. The method of claim 1, further comprising:
selecting, by the electronic device, a plurality of target environmental control devices based at least in part on the plurality of target environmental control devices being capable of taking environmental actions matching the content characteristics, wherein the plurality of target environmental control devices is selected from the plurality of environment control devices capable of different modes of environmental control located in the vicinity of the media device; and
for each target environmental control device in the plurality of target environmental control devices:

transmitting, by the electronic device, a respective environmental command that causes the respective target environmental control device to, in combination with other target environmental control devices of the plurality of target environmental control devices, create an immersive experience while the content item is being played.

11. The method of claim 10, wherein:

the plurality of target environmental control devices comprises a motion control device, a lighting device, and a thermostat; and the electronic device causes:

the motion control device to modify a motion condition, the lighting device to modify a lighting condition, and the thermostat to modify a temperature condition.

12. An electronic device comprising:

a first receiver configured to detect, by the electronic device, an inaudible signal emitted by a media device, wherein the inaudible signal identifies content characteristics of a content item that is being played by the media device;

a second receiver configured to detect, by the electronic device based at least in part on the content characteristics identified by the inaudible signal, an environmental condition in a vicinity of the media device; and a processor configured to:

select, by the electronic device, a target environmental control device for controlling the environmental condition based at least in part on the target environmental control device being capable of taking an environmental action matching the content characteristics, wherein the target environmental control device is selected from a plurality of environmental control devices capable of different modes of environmental control located in the vicinity of the media device; and transmit, by the electronic device to the target environmental control device, an environmental command that causes the target environmental control device to modify the environmental condition.

13. The electronic device of claim 12, wherein the inaudible signal comprises an inaudible wake command.

14. The electronic device of claim 12, wherein the electronic device is a voice-activated electronic device.

15. The electronic device of claim 12, wherein the target environment control device is at least one of: a lighting device, a thermostat, a camera, a wearable article, an aroma device, a furniture article, or a feedback platform that provides haptic, vibration, tactile, or spatial effect.

16. The electronic device of claim 12, wherein the environmental command is further based on an audio input emitted by the media device.

17. The electronic device of claim 12, wherein the environmental command is a contextual response based on a content characteristic of the content item played by the media device.

18. The electronic device of claim 17, wherein the content characteristic comprises at least one of: a content context of an audio portion of the content item or a content context of a video portion of the content item.

19. The electronic device of claim 12, wherein the detected environmental condition comprises at least one of: a lighting condition, a temperature condition, a humidity condition, an aromatic condition, a flavor condition, a pressure condition, vibration condition, a motion condition, or a tilt condition detected in the vicinity of the media device.

20. The electronic device of claim 12, wherein the detected environmental condition is detected using a sensor interface connected to the electronic device, the sensor interface comprising at least one of:

a motion sensor;

a light sensor;

an accelerometer;

an e-compass;

a satellite transceiver;

an image sensor; or a vibration device.

* * * * *